Patented June 12, 1923.

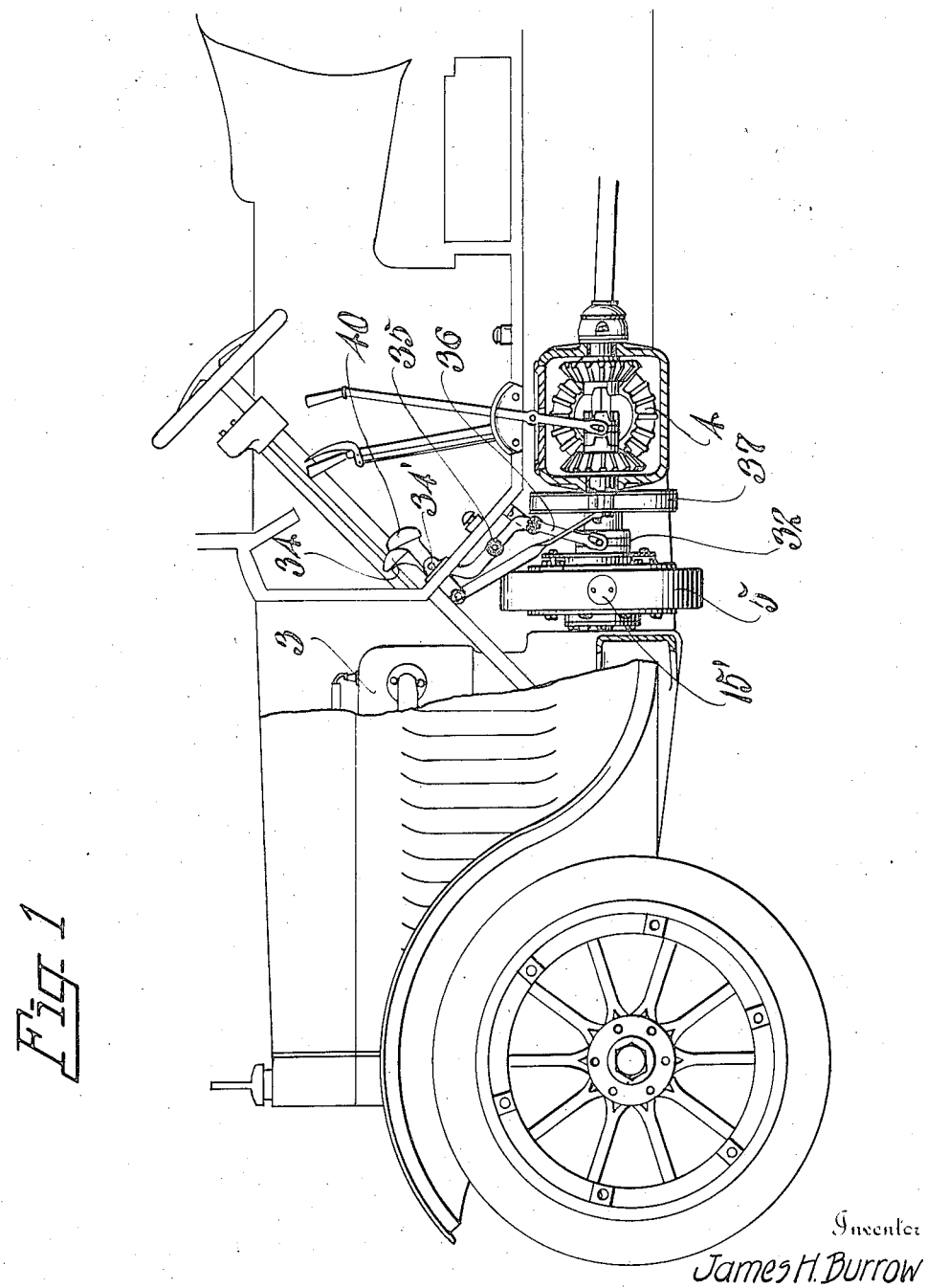

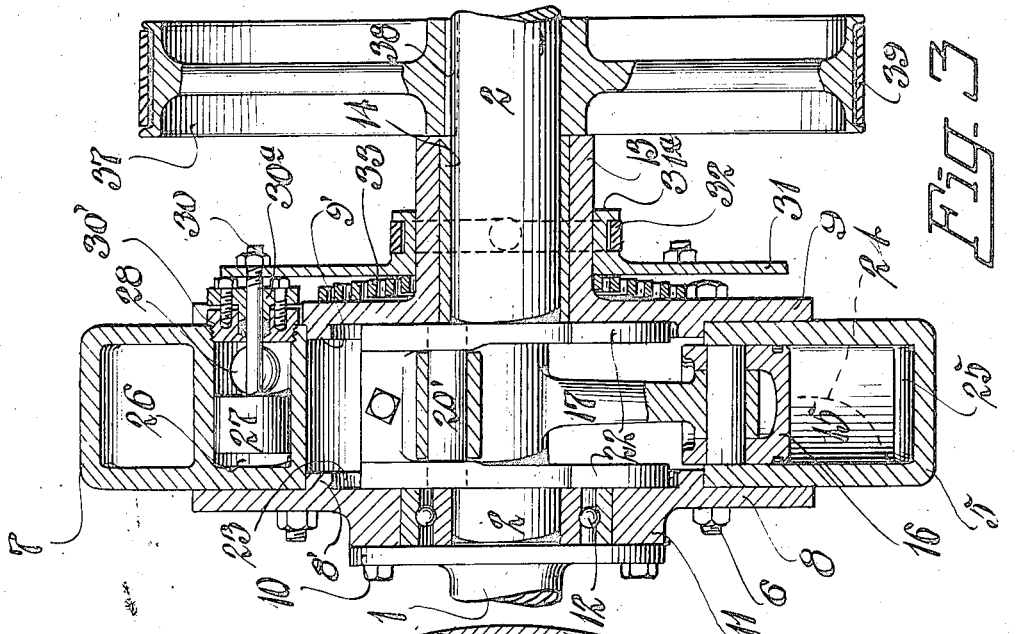

1,458,390

UNITED STATES PATENT OFFICE.

JAMES H. BURROW AND GEORGE A. BURROW, OF SPOKANE, WASHINGTON.

HYDRAULIC TRANSMISSION.

Application filed October 24, 1919. Serial No. 333,041.

*To all whom it may concern:*

Be it known that we, JAMES H. BURROW and GEORGE A. BURROW, citizens of the United States, residing at Spokane, in the county of Spokane and State of Washington, have invented certain new and useful Improvements in Hydraulic Transmissions, of which the following is a specification.

The present invention relates to an improved hydraulic transmission adapted especially for variable speeds in transmitting power from the prime mover or motor to the driven device or shaft, and particularly applied for utilization with internal combustion drives for automobiles, boats, and for speed changing mechanism in connection with the driving of conveyers, elevators, and other types of machinery, where it is desired to vary the velocity ratio of the driven device or shaft to the movement of the prime mover or motor.

The transmission device is herein incorporated and used as the fly wheel or balance wheel, for the propelling mechanism of an automobile, in which the hydraulic power-transmitting device is interposed between the alined driving and driven shafts, and couples them together to operate at variable speeds.

In the accompanying drawings one specific example of the physical embodiment of our invention is illustrated, in connection with an automobile, showing the parts combined and arranged according to the best mode we have so far devised for the practical application of the principles of our invention, but it will be understood that changes and alterations may be made therein, within the scope of our appended claim without departing from the spirit of our invention.

The invention consists in certain novel combinations and arrangements of parts including the pumps and valve mechanisms for the power transmission fluid in the rotor as hereinafter explained and pointed out, and as illustrated in the accompanying drawings, in which—

Figure 1 is a view showing so much of an automobile and its propelling mechanism or motor as is necessary to illustrate in connection therewith the transmission device which is the subject matter of the invention, the reverse gearing of the propelling device also being illustrated.

Figure 2 is an enlarged, vertical, transverse view in section of the rotor, showing also some of the pump mechanisms in section and also the controlling valves in section.

Figure 3 is a vertical, longitudinal, sectional view at line 3—3 of Figure 2.

In the preferred form of the invention as illustrated in the drawings the propelling motor and mechanism for an automobile are exemplified, the driving or engine shaft being indicated by the numeral 1 and the driven shaft designated 2, these shafts being alined longitudinally of the automobile and operated from the engine or motor 3 of usual type. The reverse gearing for the driving mechanism is indicated at 4, and the hydraulic or fluid power transmission mechanism indicated as a whole by the numeral 5, is utilized to couple the adjoining ends of the shafts 1 and 2, and interposed between the reverse gearing and the engine or motor 3, well toward the front of the propelling mechanism, and adjacent the internal combustion engine 3 to whose shaft 1 it is rigidly connected, and for which it acts as a fly wheel or balance wheel to conserve and stabalize its power.

The rotor 7 is a cast disk, circular in shape and flat, and rigidly fixed between a pair of side plates 8 and 9, circular in form, and bolted or fixed to the rotor by bolts 6 provided with the usual nuts for securing the parts together. The plate 8 is bolted to the circular flange 10 formed integrally with the end of the driving shaft 1, the bolts passing into the thickened hub 11 of the plate 8, between which hub and the end of the shaft 2, a ball bearing 12 is provided for the shaft 2, while at the opposite side of the rotor the shaft 2 has bearings in the sleeve 13 of the side plate 9, a bushing 14 of bearing metal being interposed between the bearing sleeve and shaft, as usual. From this description it will be apparent that the rotor is fixed to and rotates with the driving shaft 1, and the alined driven shaft 2 has proper bearings in the rotor and is capable of rotation independent of the rotor, although the former rotates with the latter when the parts are coupled together.

The circulation pumping system for the power transmission fluid, oil or water, is maintained by four pumps each involving a cylindrical bore 15 in the rotor which bore extends from the inner chamber 15ᵉ, outwardly, through the open periphery of the rotor, which latter is closed by a screw plug 15'. The cylinders or bores are located in diametrically arranged, alined pairs as shown in Figure 2, and access is had to the cylinders and to the open chamber 15ª through the openings in the periphery of the rotor after the screw plugs 15' have been removed. The circular crank chamber 15ª of the rotor is closed at its respective sides by the plates 8 and 9, and in Figure 3 it will be observed that these plates have annular flanges 8' and 9' respectively that fit against the inner wall of the rotor to make a close and secure fit between the rotor and its side plates.

The pump cylinder has a piston 16 and is pivotally connected by its rod or stem 17 to the divided ring or journal 18 on the crank portion or bearing 19 of the shaft 2, a bearing sleeve 20 of suitable anti-friction metal being interposed between the journal ring or bearing ring and the crank journal, as seen in Figure 2. Three of the stems are pivoted at both ends, to their pistons and to the journal ring, the pivot pins being indicated by the number 20' in each instance, and in Figure 2 it will be apparent that the hollow construction of the pistons together with the pivotal connection between these hollow pistons and the journal ring will permit the free reciprocal movement of the pistons in their cylinders called for by the circulation of the transmission fluid, or water. The stability of the rotary movement of the rotor with reference to the journal head or ring 18 is maintained by a pair of side plates 22 in the form of segments of circular disks which revolve in the annular recesses 23, in the respective plates 8 and 9, formed by the annular flanges or rings 8' and 9' of these plates. Thus as the rotor revolves it is guided and steadied by these side segmental plates of the eccentric ring 18 and they prevent wabbling or loose motion of the parts.

The diametrically disposed piston cylinders are connected by the passages 24, four in number and located between the adjoining piston cylinders, and the passages in turn are connected by the enlarged chambers 25, that are formed at the outer ends of the cylinders, thus completing an annular circuit, although the passages do not extend on circumferential lines about the rotor, as shown in Figure 2. The passages 24 are each intercepted by a transverse valve chamber or pocket 26, cylindrical in form, and of larger diameter than the cylindrical cross-area of the passage, in which the slide valve 27 is operative to govern the ports 28 entering these valve chambers at opposite sides, from the passages. The four valves are shown in transverse section in Figure 2 where it is apparent that they are fashioned as open cylinders or hollow pistons having a spider therein for attachment of the fixed stem 30. The valve chambers 26 are in the form of open pockets extending inwardly from one side of the rotor and these open end pockets are closed by screw plugs 30' passed through openings in the side plate 9 and threaded into the rotor, and a packing gland 30ª is also associated with the plug for the stem 30 of the valve to pass through.

The valves are all actuated simultaneously to uniformly close their respective ports 28 in the series extending around the rotor, and to this end a plate or four-arm spider 31 is employed having its slide ring 31ª movable on the sleeve 13 longitudinally of the sleeve by movement imparted to the fork ring 32 in the grooved ring 31ª. The slide ring is urged outwardly or away from the rotor by a coiled spring 33 located between the ring and the plate 9, and thus tends to pull on the stems 30 that are fixed in the valve plate 31 to move the valves and close the ports 28. The valves are moved positively to open the ports by pressure on the pedal lever 34, located at the dashboard in Figure 1, in convenient position for the driver of the automobile, and pivoted at 34' therein, while at 35 the fork 36 is pivoted to the pedal, and the fork, through the ring 32 in the grooved ring 31ª acts on the slidable valve plate 31.

A brake wheel 37 is keyed to the driven shaft at 38, and the friction brake band 39 may be actuated by the pedal 40 in usual manner to apply friction to the brake wheel to hold the driven shaft 2 against rotation and prevent the circulation of the oil from revolving the shaft 2, when it is desired that the automobile shall not be propelled. Normally the piston valves are held in closed position by the tension of the spring 33 which urges the valve plate, and through it, the valve stems and valves, to the right in Figure 3, thus bringing the respective valves to close, each one, its pair or ports to effectively prevent circulation of the oil as the rotor revolves, and of course the valves are opened as the valve plate is shifted by pedal pressure at 34. The closing of the valved ports prevents circulation of the oil as the rotor revolves causing the action of the pumps to revolve the driven shaft by the crank or eccentric connection within the crank chamber, and of course the increased area of the open ports 28 permits the circulation of an increased volume of oil or water. In this manner the speed of the propelled vehicle or boat may be varied either gradually or positively, and further control of the driven shaft is maintained by action of the brake wheel 37, which revolves at all times with the driven shaft.

What we claim is—

The combination of a driving shaft and its rotor having an open center, side plates attached to said rotor having annular recesses, a driven shaft having bearing disks in said recesses, an eccentric between said disks, said rotor having a passage and transverse pockets intercepting said passage, radiating pump cylinders opening into said passage, pistons for said pumps, pivotal stems between said eccentric and pistons, a slide valve in each pocket between each pair of adjoining pumps for controlling the flow of oil through said passage, spring pressed means for holding said valves normally in closed position, a bearing sleeve rigid with one of said side plates, a movable valve spider having a hub on said sleeve, and means for moving said spider to open said valves.

In testimony whereof we affix our signatures.

JAMES H. BURROW.
GEORGE A. BURROW.